US009842703B2

(12) United States Patent
Yanaka et al.

(10) Patent No.: US 9,842,703 B2
(45) Date of Patent: *Dec. 12, 2017

(54) ALUMINUM ELECTROLYTIC CAPACITOR AND RUBBER SEAL FOR SAME

(71) Applicant: ELNA CO., LTD., Yokohama-shi, Kanagawa (JP)

(72) Inventors: Hiroshi Yanaka, Fukushima (JP); Naoto Iwano, Kuroishi (JP); Kaori Matsumura, Fukushima (JP); Hikaru Santsuka, Fukushima (JP); Naozumi Kimura, Kuroishi (JP); Hidekazu Mizushima, Yokohama (JP)

(73) Assignee: ELNA CO., LTD., Yokohama-shi, Kanagawa (JP)

( * ) Notice: Subject to any disclaimer, the term of this patent is extended or adjusted under 35 U.S.C. 154(b) by 0 days.

This patent is subject to a terminal disclaimer.

(21) Appl. No.: 15/240,269

(22) Filed: Aug. 18, 2016

(65) Prior Publication Data

US 2017/0004926 A1 Jan. 5, 2017

Related U.S. Application Data

(63) Continuation of application No. 14/387,619, filed as application No. PCT/JP2012/002919 on Apr. 27, 2012, now Pat. No. 9,496,091.

(51) Int. Cl.
| | |
|---|---|
| *H01G 9/10* | (2006.01) |
| *H01G 9/008* | (2006.01) |
| *H01G 9/045* | (2006.01) |
| *H01G 9/145* | (2006.01) |
| *H01G 9/00* | (2006.01) |
| *H01G 9/02* | (2006.01) |
| *H01G 11/80* | (2013.01) |
| *H01G 4/32* | (2006.01) |

(52) U.S. Cl.
CPC ............... *H01G 9/10* (2013.01); *H01G 9/008* (2013.01); *H01G 9/0029* (2013.01); *H01G 9/02* (2013.01); *H01G 9/045* (2013.01); *H01G 9/145* (2013.01); *H01G 4/32* (2013.01); *H01G 11/80* (2013.01)

(58) Field of Classification Search
CPC ........ H01G 9/10; H01G 9/0029; H01G 9/008; H01G 9/02; H01G 9/045; H01G 9/145; H01G 4/32; H01G 11/80
See application file for complete search history.

(56) References Cited

U.S. PATENT DOCUMENTS 9,496,091 B2 * 11/2016 Yanaka ................. H01G 9/008

* cited by examiner

*Primary Examiner* — Dion R Ferguson
(74) *Attorney, Agent, or Firm* — Manabu Kanesaka

(57) ABSTRACT

An aluminum electrolytic capacitor includes a capacitor element having lead terminals; an armor case housing the capacitor element; and a rubber seal having a terminal passage hole for the lead terminals drilled therein and mounted on an opening section of the armor case. A hole diameter of a lead wire passage hole is smaller than an outside diameter of an outside lead wire, and a conical guide surface of progressively smaller diameter is formed between a round bar mating hole and the lead wire passage hole within a terminal passage hole. A passage guide part of progressively smaller diameter from a lead wire body is integrally furnished at an end of the outside lead wire so as to have a smaller diameter than the hole diameter of the lead wire passage hole, forming a conical sloped surface having a predetermined angle on a peripheral surface of the passage guide part.

4 Claims, 7 Drawing Sheets

EXAMPLE 1
OF PRESENT INVENTION

φ3=0.3
θb=45°

EXAMPLE 1
OF PRESENT INVENTION

φ3=0.3
θb=70°

EXAMPLE 1
OF PRESENT INVENTION

φ3=0.1
θb=70°

COMPARATIVE EXAMPLE 1

φ3=0.8
θb=0°

COMPARATIVE EXAMPLE 1

φ3=0.6
θb=60°

COMPARATIVE EXAMPLE 1

φ3=0.2
θb=15°

COMPARATIVE EXAMPLE 1

φ3=0.6
θb=60°

COMPARATIVE EXAMPLE 1

φ3=0.6
θb=70°

ALUMINUM ELECTROLYTIC CAPACITOR AND RUBBER SEAL FOR SAME

CROSS-REFERENCE TO RELATED APPLICATIONS

The present application is a continuation application of Ser. No. 14/387,619, filed on Sep. 24, 2014, which is National Phase of International Application No. PCT/JP2012/002919 filed Apr. 27, 2012.

TECHNICAL FIELD

The present invention relates to an aluminum electrolytic capacitor and, more particularly, to a technique for inserting a lead terminal through a terminal passage hole of a rubber seal without applying such an excessively large load as to deteriorate characteristics to a capacitor element.

BACKGROUND ART

Referring to a sectional view of FIG. 11, an aluminum electrolytic capacitor includes, as basic components, a capacitor element 1 including a pair of lead terminals 2, 2. As shown in FIG. 12, the capacitor element 1 is formed by winding, via not-shown separator paper, in a spiral shape, an anode foil 1a and a cathode foil 1b made of aluminum material and having the lead terminals 2 attached thereto.

The capacitor element 1 is housed in an armor case 3 having a bottomed cylindrical shape together with a predetermined electrolytic substance. An opening section of the armor case 3 is sealed by a rubber seal 4. Terminal passage holes 5, 5 are drilled in the rubber seal 4. Respective distal end portions of the lead terminals 2, 2 are drawn out to the outside through the terminal passage holes 5, 5.

Actually, the rubber seal 4 is housed in the armor case 3 together with the capacitor element 1 in a state in which the tip of the rubber seal 4 is attached to the lead terminals 2, 2 earlier. The rubber seal 4 is hermetically fixed in the opening section of the armor case 3 by caulking of a lateral reduction groove 3a of the armor case 3, which is formed later, and an end edge 3b of the armor case 3.

Usually, an aluminum case is used as the armor case 3. Isobutylene-isoprene rubber or the like is used as the rubber seal 4. Usually, non-aqueous or aqueous electrolyzed liquid is used as the electrolytic substance. However, a solid electrolyte is sometimes used.

As shown in FIG. 12, the lead terminal 2 includes a tab terminal 21 and an outside lead wire 22. The tab terminal 21 is made of an aluminum material and includes a flat section 21a press-molded in a battledore shape and a round bar section 21b.

The tab terminal 21 of this type can be obtained by cutting an aluminum round bar material at predetermined length and pressing one end side of the round bar material. The flat section 21a is attached to the anode foil 1a and the cathode foil 1b by caulking needles, welding, or the like.

Usually, a copper-coated steel wire (CP wire) is used as the outside lead wire 22. To improve solderability to a circuit board, the outside lead wire 22 includes a plated layer on the surface. In the case of Pb (lead) free, Sn 100% plating, Sn/Bi (0.5%) plating, or the like is mainly applied to the plated layer.

The outside lead wire 22 is smaller in diameter than the round bar section 21b of the tab terminal 21 and is welded to an end face of the round bar section 21b. A welded section of the outside lead wire 22 is denoted by reference numeral 23.

Incidentally, when the plated layer on the surface is the Sn 100% plating, the plated layer other than the welded section 23 is stable. However, in the welded section 23, Al, An, Cu, Fe, and the like are mixed. When the welded section 23 is exposed to the outside air, stress acts on an Sn layer because of hydration and oxidation reaction of Al. An Sn whisker (a whisker-like crystal substance) 23a intensely occurs and grows.

In the Sn/Bi (0.5%) plating, although the growth of the whisker is relaxed than that in the Sn 100%, the whisker also occurs. When the growth of the whisker is conspicuous, there is a risk that the whisker scatters on the circuit board and, in the worst case, shirt-circuits an electronic circuit.

Therefore, in order to suppress the occurrence of the whisker as much as possible and prevent the scattering of the whisker to the outside, in Patent Documents 1 and 2, as shown in FIG. 13, the applicant proposes to coaxially connect, as the terminal passage hole 5 of the rubber seal 4, a large-diameter round bar mating hole 51, in which the round bar section 21b of the tab terminal 21 is fit, and a small-diameter lead wire passage hole 52, through which the outside lead wire 22 is inserted, and set a hole diameter $\phi 2$ of the lead wire passage hole 52 smaller than an outer diameter 41 of the outside lead wire 22 ($\phi 2 < \phi 1$) to shut off the welded section 23 from the outside air.

According to Patent Documents 1 and 2, the scattering to the outside of the whisker 23a that occurs in the welded section 23 is prevented. However, on the other hand, since the hole diameter $\phi 2$ of the lead wire passage hole 52 is smaller than the outer diameter $\phi 1$ of the outside lead wire 22 ($\phi < \phi 1$), when the outside lead wire 22 is forcibly inserted through the lead wire passage hole 52, excessively large stress is applied to the capacitor element 1. Because of the excessive stress, the characteristics of the capacitor element 1 are sometimes deteriorated.

In order to solve this point, Patent Document 3 proposes to form, in the lead wire passage hole of the rubber seal, a funnel-shaped cylindrical body made of a thin film gradually reduced in diameter toward the outer side of the capacitor.

Patent Document 4 proposes to integrally form, in the lead wire passage hole of the rubber seal, a sealing plug body having a slit for inserting the lead terminal and draw out the lead terminal to the outside via the slit.

As a technique similar to Patent Document 4, Patent Document 5 proposes to integrally form, in the lead wire passage hole of the rubber seal, a sealing plug made of a thin wall for closing the passage hole and draw out the lead terminal to the outside piecing through the sealing plug.

CITATION LIST

Patent Documents

Patent Document 1: Japanese Patent Laid-Open No. 2006-295055

Patent Document 2: Japanese Patent Laid-Open No. 2008-10865

Patent Document 3: Japanese Patent Laid-Open No. 2008-251982

Patent Document 4: Japanese Patent Laid-Open No. 2009-212175

Patent Document 5: Japanese Patent Laid-Open No. 2010-161277

DISCLOSURE OF THE INVENTION

Problems to be Solved by the Invention

However, in the case of the invention described in Patent Document 3, there is a problem in that, because of a molding technique for the rubber seal, it is difficult to integrally form, in the rubber seal, the funnel-shaped cylindrical body made of the thin film gradually reduced in diameter toward the outer side of the capacitor and, even if the cylindrical body can be molded, reliability is poor because the periphery of the lead terminal is sealed by the funnel-shaped thin film portion.

In the invention described in Patent Document 4, the lead wire is drawn out to the outside via the slit of the sealing plug. In the invention described in Patent Document 5, the lead terminal is drawn out to the outside piercing through the sealing plug. Therefore, in both inventions, there is a problem in that it is difficult to surely seal the periphery of the lead terminal.

Therefore, it is an object of the present invention to insert the lead terminal through the terminal passage hole of the rubber seal without applying such an excessively large load as to deteriorate characteristics to the capacitor element and while keeping a state in which the lead terminal can be surely shut off from the outside air.

Means for Solving the Problems

In order to solve the problems, the present invention provides an aluminum electrolytic capacitor including: a capacitor element formed by winding, via a separator, an anode foil and a cathode foil both having lead terminals attached thereto; an armor case having a bottomed cylindrical shape in which the capacitor element is housed together with a predetermined electrolytic substance; and a rubber seal having a terminal passage hole for the lead terminals drilled therein and mounted on an opening section of the armor case, the lead terminal including a tab terminal having a flat section and a round bar section and an outside lead wire having a plated layer on the surface and welded to an end of the round bar section, the terminal passage hole of the rubber seal including a round bar mating hole, in which the round bar section of the tab terminal is fit, and a lead wire passage hole coaxial with the round bar mating hole and smaller in diameter than the round bar mating hole, the outside lead wire being inserted through the lead wire passage hole, and a hole diameter of the lead wire passage hole being smaller than an outer diameter of the outside lead wire, the outside lead wire being forcibly inserted through the lead wire passage hole to be drawn out to the outside of the armor case, and a welded section of the round bar section and the outside lead wire being shut off from the outside air, wherein a conical guide surface gradually reduced in diameter is formed between the round bar mating hole and the lead wire passage hole in the terminal passage hole, the outside lead wire includes a lead wire body larger in diameter than the hole diameter of the lead wire passage hole and a passage guide part integrally connected to a distal end portion of the lead wire body, the passage guide part is formed to be gradually reduced in diameter from the lead wire body to be smaller in diameter than the hole diameter of the lead wire passage hole, and, in the passage guide part, a substantially conical sloped surface having a predetermined inclination angle is formed.

In the present invention, it is preferable that, when an inclination angle of the guide surface with respect to an imaginary plane X orthogonal to an axis Y passing the terminal passage hole is represented as $\theta a$ and the inclination angle of the sloped surface is represented as $\theta b$, $\theta a < \theta b$.

Preferably, at least the surface of the passage guide part of the outside lead wire and/or at least the inner surface of the lead wire passage hole of the rubber seal is coated with low-friction resin.

In this case, it is preferable that coating thickness of the low-friction resin is 0.3 to 1.5 μm.

As the low-friction resin, polyparaxylene or silicone oil emulsion is preferably adopted.

When the entire rubber seal is coated with the low-friction resin, the electrolytic substance in use may be either non-aqueous or aqueous electrolyzed liquid.

The present invention is suitable for an aluminum electrolytic capacitor in which lead-free tin plating is applied to the outside lead wire and a whisker tends to occur in a welded section of the outside lead wire.

According to a preferred form of the present invention, in preventing the electrolyzed liquid from being accumulated between the guide surface and the welded section, when an inclination angle of the welded section with respect to an imaginary plane X orthogonal to an axis Y passing the terminal passage hole is represented as $\theta c$, the guide surface includes an inclined surface having an angle substantially the same as the inclination angle $\theta c$.

As a more preferable form, with a boundary set in an intersection portion of an extended line of an outer diameter surface of the lead wire body and the guide surface in a state in which the lead wire body and the lead wire passage hole are set to be coaxial, the guide surface includes a first inclined surface inclined at an angle substantially the same as the inclination angle $\theta c$ from the intersection portion to the inner surface of the round bar mating hole and a second inclined surface inclined at an angle smaller than the inclination angle $\theta c$ from the intersection portion to the inner peripheral edge of the lead wire passage hole.

In preventing the electrolyzed liquid from being accumulated between the guide surface and the welded section, it is preferable that the lead terminals are fit in the terminal passage hole until the lower end of the welded section comes into contact with the intersection portion so that the first inclined surface substantially adheres to the welded section.

The present invention also includes a three-terminal type aluminum electrolytic capacitor including, besides the lead terminals respectively attached to the anode foil and the cathode foil, an electrically neutral dummy terminal not connected to the capacitor element, a dummy terminal passage hole for the dummy terminal being further drilled in the rubber seal and the dummy terminal and the dummy terminal passage holes being formed the same as the lead terminals and the terminal passage hole for the lead terminals.

The present invention also includes a rubber seal for an aluminum electrolytic capacitor including a terminal passage hole through which a lead terminal formed by welding an outside lead wire to an end of a round bar section included in a tab terminal, the terminal passage hole including a round bar mating hole in which the round bar section is fit and a lead wire passage hole coaxial with the round bar mating hole and smaller in diameter than the round bar mating hole, the outside lead wire being inserted through the lead wire passage hole, and a hole diameter of the lead wire passage hole being smaller than an outer diameter of the outside lead wire, and the outside lead wire being forcibly inserted through the lead wire passage hole such that a welded section of the round bar section and the outside lead wire is shut off from the outside air, wherein a conical guide surface gradually reduced in diameter is formed between the round bar mating hole and the lead wire passage hole in the terminal passage hole and, when an inclination angle of the welded section with respect to an imaginary plane X orthogonal to an axis Y passing the terminal passage hole is represented as θc, the guide surface includes an inclined surface having an angle substantially the same as the inclination angle θc.

In the rubber seal, too, with a boundary set in an intersection portion of an extended line of an outer diameter surface of the outside lead wire and the guide surface in a state in which the outside lead wire and the lead wire passage hole are set to be coaxial, the guide surface includes a first inclined surface inclined at an angle substantially the same as the inclination angle θc from the intersection portion to the inner surface of the round bar mating hole and a second inclined surface inclined at an angle smaller than the inclination angle θc from the intersection portion to the inner peripheral edge of the lead wire passage hole.

It is preferable that at least the inside of the terminal passage hole is coated with low-friction resin at film thickness of 0.3 to 1.5 µm.

Advantages of the Invention

According to the present invention, the conical guide surface gradually reduced in diameter is formed between the round bar mating hole and the lead wire passage hole in the terminal passage hole, the passage guide part gradually reduced in diameter from the lead wire body to be smaller in diameter than the hole diameter of the lead wire passage hole is integrally formed on the distal end side of the outside lead wire, and the substantially conical sloped surface having the predetermined inclination angle is formed in the passage guide part. Therefore, it is possible to insert the lead terminal through the terminal passage hole of the rubber seal without applying such an excessively large load as to deteriorate characteristics to the capacitor element and while keeping a state in which the lead terminal is surely shut off from the outside air.

Therefore, in manufacturing the aluminum electrolytic capacitor in which the lead-free tin plating is applied to the outside lead wire, occurrence of a whisker in the welded section is suppressed as much as possible, and, even if the whisker occurs, in preventing scattering of the whisker to the outside, the hole diameter of the lead wire passage hole is set smaller than the outer diameter of the outside lead wire, the outside lead wire is forcibly inserted through the lead wire passage hole and drawn out to the outside of the armor case, and the welded section of the round bar section and the outside lead wire is shut off from the outside air, an yield rate of the manufacturing is improved and it is possible to further improve productivity.

When the inclination angle of the welded section with respect to the imaginary plane X orthogonal to the axis Y passing the terminal passage hole is represented as θc, the inclined surface having the angle substantially the same as the inclination angle θc is included in the guide surface. Therefore, an amount of the electrolyzed liquid accumulated between the guide surface and the welded section greatly decreases. It is possible to prevent a liquid leak of the electrolyzed liquid.

MODE FOR CARRYING OUT THE INVENTION

Figure 1:
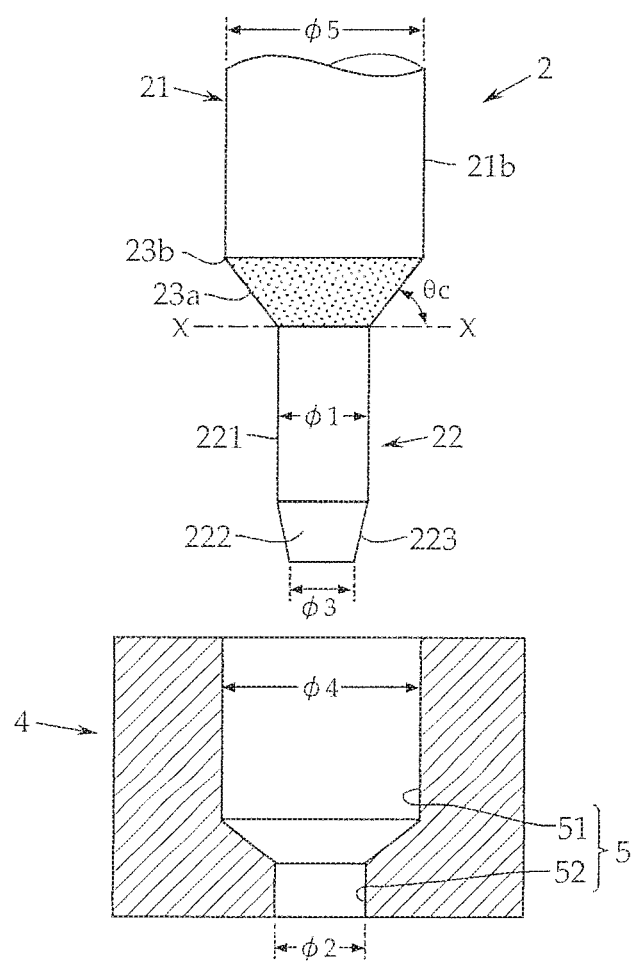
FIG. 1 is a sectional view separately showing an outside lead wire of a lead terminal and a terminal passage hole of a rubber seal included in an aluminum electrolytic capacitor of the present invention.

Next, several embodiments of the present invention are explained with reference to FIG. 1 to FIG. 10(b). However, the present invention is not limited to the embodiments. Note that, in the embodiments, components that are the same as or may be regarded the same as the conventional example explained with reference to preceding FIGS. 11 to 13 are denoted by the same reference numerals and signs.

Figure 2:
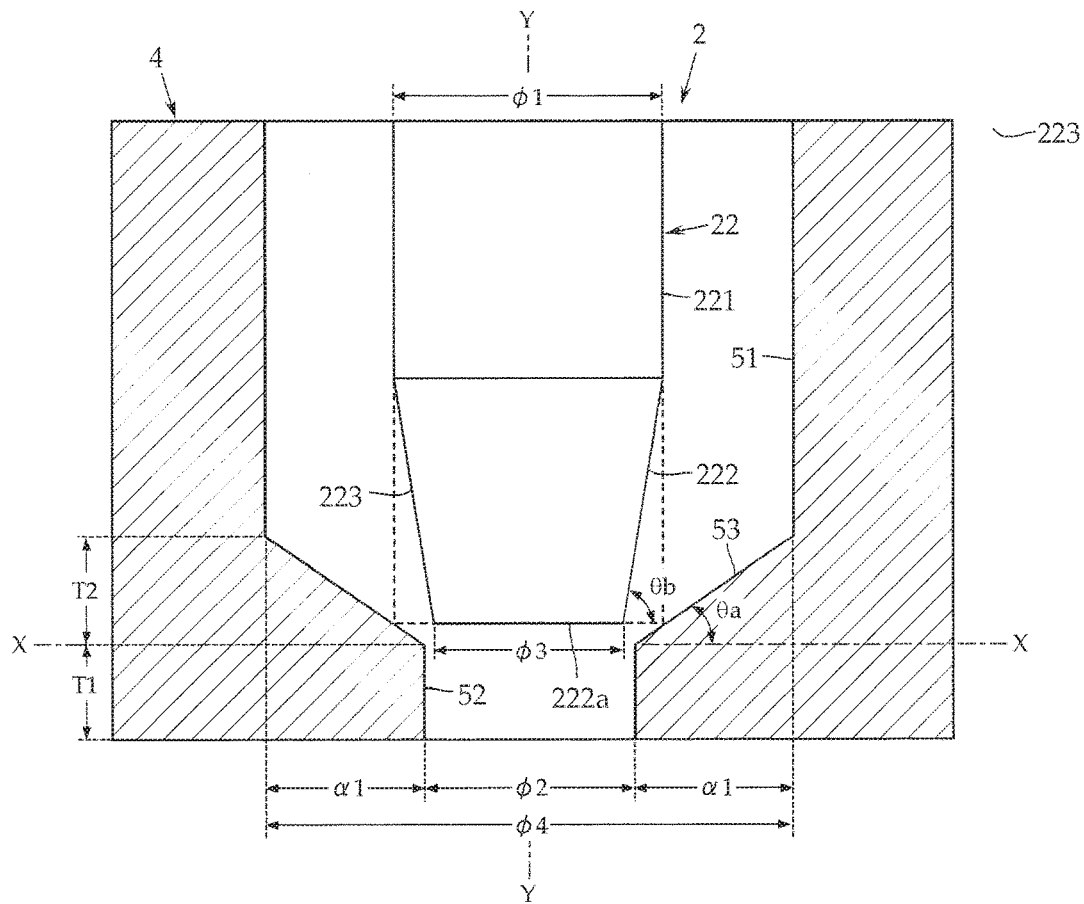
FIG. 2 is an enlarged sectional view showing a main part of FIG. 1.

In FIG. 1 and FIG. 2, only a main part of the present invention is shown. However, referring to FIG. 11 to FIG. 13 as well, like the conventional example explained earlier, an aluminum electrolytic capacitor of the present invention includes, as basic components, the capacitor element 1 including the pair of lead terminals 2, 2, the armor case 3, and the rubber seal 4.

Figure 12:
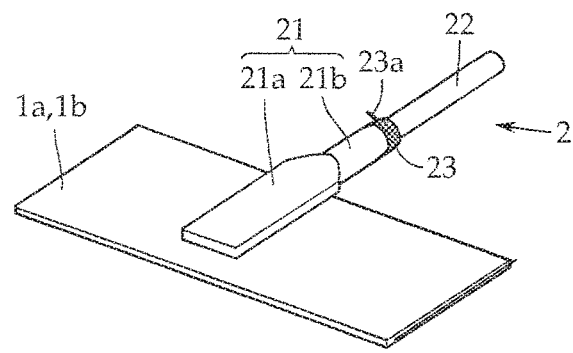
FIG. 12 is a perspective view showing a state in which the lead terminal used in the aluminum electrolytic capacitor is attached to an electrode foil.
Figure 13:
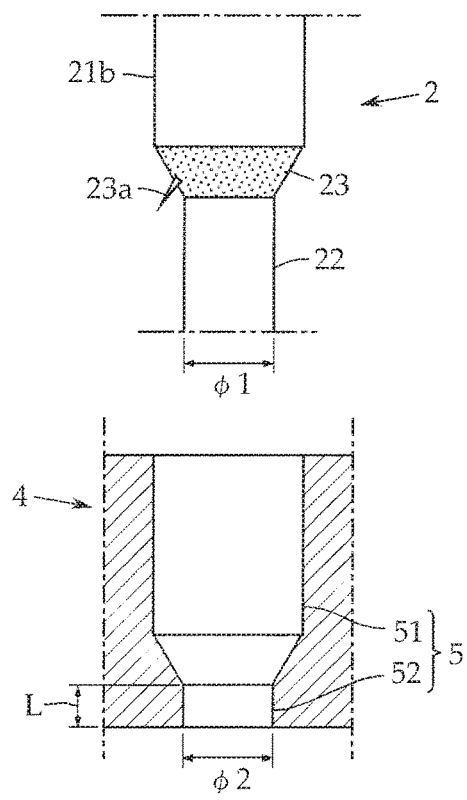
FIG. 13 is an enlarged sectional view showing, as a conventional example, a dimensional relation between a terminal passage hole of a rubber seal and an outside lead wire of a lead terminal for which whisker measures are taken.

As shown in FIG. 12, the capacitor element 1 is formed by winding, in a spiral shape, via not-shown separator paper, the anode foil 1a and the cathode foil 1b made of the aluminum material having the lead terminal 2 attached thereto.

The capacitor element 1 is housed in the armor case 3 having the bottomed cylindrical shape made of the aluminum material together with the predetermined electrolytic substance. The opening section of the armor case 3 is sealed by the rubber seal 4. The terminal passage holes 5, 5 are drilled in the rubber seal 4. The respective distal end portions of the lead terminals 2, 2 are drawn out to the outside through the terminal passage holes 5, 5.

Actually, the rubber seal 4 is housed in the armor case 3 together with the capacitor element 1 in a state in which the rubber seal 4 is attached to the lead terminals 2, 2 earlier. The rubber seal 4 is hermetically fixed in the opening section of the armor case 3 by caulking of the lateral reduction groove 3a of the armor case 3, which is formed later, and the end edge 3b of the armor case 3.

As the rubber seal 4, preferably, a rubber material such as vulcanized IIR (isobutylene-isoprene rubber) or EPT (ethylene propylene rubber) is used. As the electrolytic substance, usually, non-aqueous or aqueous electrolyzed liquid is used. However, a solid electrolyte may be used. Usually, the capacitor element 1 is housed in the armor case 3 in a state in which the electrolyzed liquid is impregnated.

As shown in FIG. 12, the lead terminal 2 includes the tab terminal 21 and the outside lead wire 22. The tab terminal 21 is made of the aluminum material and includes the flat section 21a press-molded in the battledore shape and the round bar section 21b.

The tab terminal 21 of this type can be obtained by cutting an aluminum round bar material at predetermined length and pressing one end side of the round bar material. The flat section 21a is attached to the anode foil 1a and the cathode foil 1b by caulking needles, welding, or the like.

Usually, a copper-coated steel wire (CP wire) is used as the outside lead wire 22. To improve solderability to a circuit board, the outside lead wire 22 includes a plated layer on the surface. In the case of Pb (lead) free, Sn 100% plating, Sn/Bi (0.5%) plating, or the like is mainly applied to the plated layer.

As shown in FIG. 1 as well, the outside lead wire 22 is smaller in diameter than the round bar section 21b of the tab terminal 21 and is welded to an end face of the round bar section 21b. A welded section of the outside lead wire 22 is denoted by reference numeral 23.

As explained above, when the plated layer on the surface is the Sn 100% plating, the plated layer other than the welded section 23 is stable. However, in the welded section 23, Al, An, Cu, Fe, and the like are mixed. When the welded section 23 is exposed to the outside air, stress acts on an Sn layer because of hydration and oxidation reaction of Al. An Sn whisker (a whisker-like crystal substance) 23a intensely occurs and grows.

In the Sn/Bi (0.5%) plating, the growth of the whisker is relaxed than that in the Sn 100%, the whisker also occurs. When the growth of the whisker is conspicuous, there is a risk that the whisker scatters on the circuit board and, in the worst case, shirt-circuits an electronic circuit.

In order to suppress the occurrence of the whisker in the welded section 23 as much as possible and prevent the scattering of the whisker to the outside, in the present invention, as the terminal passage hole 5 of the rubber seal 4, the large-diameter round bar mating hole 51, in which the round bar section 21b of the tab terminal 21 is fit, and the small-diameter lead wire passage hole 52, through which the outside lead wire 22 is inserted, are coaxially connected and the hole diameter $\phi 2$ of the lead wire passage hole 52 is set smaller than the outer diameter $\phi 1$ of the outside lead wire 22 ($\phi 2<\phi 1$) to shut off the welded section 23 from the outside air. However, in the present invention, a configuration explained below is adopted to make it possible to insert the outside lead wire 22 through the lead wire passage hole 52 of the rubber seal 4 without applying such an excessively large load as to deteriorate characteristics to the capacitor element 1 and while keeping a state in which the outside lead wire 22 is surely shut off from the outside air.

Referring to FIG. 2, according to the present invention, besides a lead wire body 221 having an outer diameter $\phi 1$ larger than a hole diameter 42 of the lead wire passage hole 52, the outside lead wire 22 integrally includes a passage guide part 222 to the lead wire passage hole 52 on the distal end portion side (in FIG. 2, the lower end side) of the lead wire body 221.

Note that, in FIG. 2, a chain line drawn downward from the lead wire body 221 indicates the conventional outside lead wire not including the passage guide part 222.

The passage guide part 222 is formed to be gradually reduced in diameter from the lead wire body 221 such that a distal end portion (in FIG. 2, a lower end portion) 222a thereof has a diameter $\phi 3$ smaller than the hole diameter $\phi 2$ of the lead wire passage hole 52 ($\phi 3<\phi 2$).

In this embodiment, the distal end portion 222a having the outer diameter $\phi 3$ of the passage guide part 222 is formed substantially flat. However, a portion above the outer diameter $\phi 3$ entering the lead wire passage hole 52 may be formed in an arcuate shape.

In the present invention, in the passage guide part 222, a conical sloped surface 223 having a predetermined angle is formed in a portion from the distal end portion 222a having the outer diameter $\phi 3$ to the lead wire body 221 having the outer diameter $\phi 1$. Consequently, when the outside lead wire 22 is inserted through the lead wire passage hole 52, first, the sloped surface 223 of the passage guide part 222 comes into contact with the inner edge of the lead wire passage hole 52.

On the rubber seal 4 side, as the terminal passage hole 5, the round bar mating hole 51 having a hole diameter $\phi 4$ ($\phi 1<\phi 4$), in which the round bar section 21b of the tab terminal 21 is fit closely, and the lead wire passage hole 52 having a hole diameter $\phi 2$ ($\phi 3<\phi 2<\phi 1$) are coaxially provided. However, in the present invention, a conical guide surface 53 gradually reduced in diameter from the round bar mating hole 51 side is formed between the round bar mating hole 51 and the lead wire passage hole 52. Note that, when the outer diameter of the round bar section 21b is represented as $\phi 5$, the hole diameter $\phi 4$ of the round bar mating hole 51 is slightly smaller than the outer diameter $\phi 5$ of the round bar section 21b ($\phi 4<\phi 5$).

With the passage guide part 222 set as a distal end, the outside lead wire 22 is inserted through the lead wire passage hole 52 while expanding the lead wire passage hole 52. In that case, in order to prevent a peak load from being applied to the capacitor element 1, when an inclination angle of the guide surface 53 with respect to the imaginary plane X-X orthogonal to the axis Y-Y passing the terminal passage hole 5 is represented as θa and an inclination angle of the sloped surface 223 is represented as θb, it is preferable that θa<θb. Note that a creeping distance of the sloped surface 223 is proportional to the inclination angle θb.

In improving insertability of the outside lead wire 22 through the lead wire passage hole 52, it is also effective to coat the inner surface of the lead wire passage hole 52 and the surface of the guide surface 53 with low-friction resin such as polyparaxylene or silicone oil emulsion for improving slippage.

In this case, coating thickness of the low-friction resin is preferably 0.3 to 1.5 μm. Note that, if the film thickness is smaller than 0.3 μm, the slippage by the low-friction resin is not sufficiently displayed. On the other hand, it is undesirable if the film thickness exceeds 1.5 μm because the electrolyzed liquid is likely to leak from between the outside lead wire 22 and the lead wire passage hole 52. The low-friction resin may be applied to the outside lead wire 22 side.

When lead-free tin plating is applied to the outside lead wire 22, in suppressing the growth of the whisker 23*a* in the welded section 23, it is preferable to form the guide surface 53 to adhere to the welded section 23*a*.

Figure 3:
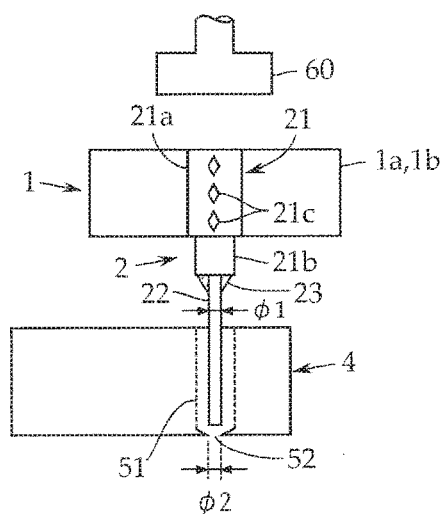
FIG. 3 is a schematic diagram showing a state in which the outside lead wire of the lead terminal is inserted through the terminal passage hole of the rubber seal.

As shown in FIG. 3, in a state in which the flat section 21*a* of the lead terminal 2 is firmly attached to the electrode foils 1*a* and 1*b* of the capacitor element 1 by, for example, the caulking needle, the lead terminal 2 is forcibly inserted into the lead wire passage hole 52 of the rubber seal 4 by a pressing force of a press head 60 applied from an upper part of the capacitor element 1. Concerning examples 1 to 3 of the present invention shown in FIGS. 4(*a*), 4(*b*), and 4(*c*) and comparative examples 1 to 5 shown in FIGS. 5(*a*), 5(*b*), 5(*c*), 5(*d*), and 5(*e*), pressure applied to a caulking portion 21*c* of the lead terminal 2 was measured. Therefore, an example of the measurement is explained.

Note that, after the distal end portion of the outside lead wire 22 projects from the lead wire passage hole 52, the pressing by the press head 60 is stopped. Instead, the lead terminal 2 is pulled by a not-shown pulling device. Therefore, the pressure applied to the caulking portion 21*c* of the lead terminal 2 is reduced to substantially 0.

In this example, in both of examples 1 to 3 of the present invention and comparative examples 1 to 5, a lead wire (a CP wire) having a diameter of ϕ0.8 mm was used as the outside lead wire 22. In both of examples 1 to 3 of the present invention and comparative examples 1 to 5, the hole diameter ϕ2 of the lead wire passage hole 52 was set to 0.5 mm and the inclination angle θa of the guide surface 53 was set to 30°.

Figure 4A:
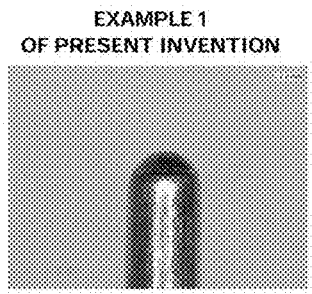
FIGS. 4(a), 4(b), and 4(c) are actual object photographs showing end shapes of the outside lead wire according to examples 1 to 3 of the present invention.
Figure 4B:
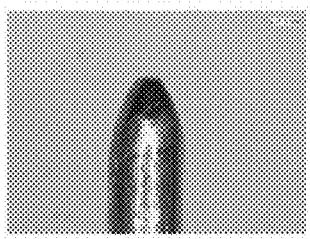
Figure 4C:
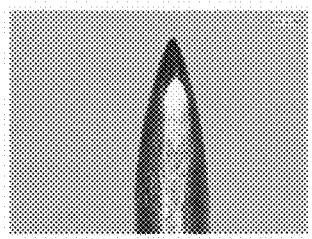
Figure 5A:
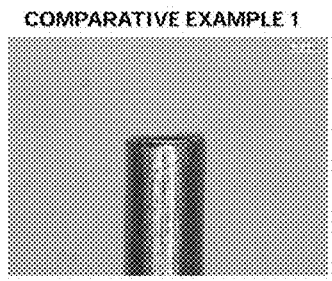
FIGS. 5(a), 5(b), 5(c), 5(d), and 5(e) are actual object photographs showing end shapes of the outside lead wire as comparative examples 1 to 5.
Figure 5B:
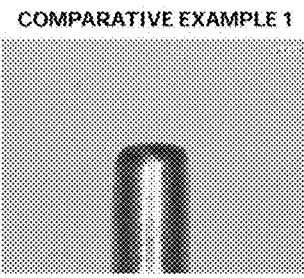
Figure 5C:
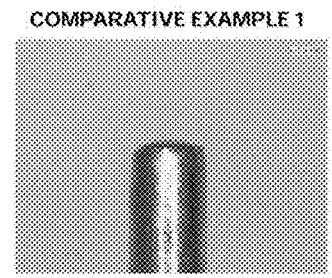
Figure 5D:
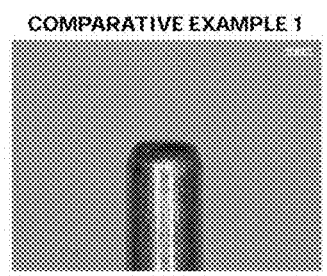
Figure 5E:
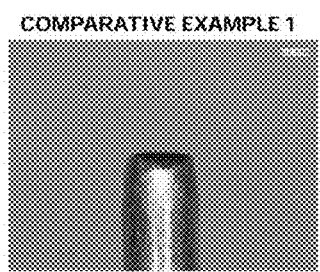

In example 1 of the present invention shown in FIG. 4(*a*), the outer diameter ϕ3 of the distal end portion 222*a* of the passage guide part 222 was set to 0.3 mm and the inclination angle θb of the sloped surface 223 was set to 45°.

In example 2 of the present invention shown in FIG. 4(*b*), the outer diameter ϕ3 of the distal end portion 222*a* of the passage guide part 222 was set to 0.3 mm and the inclination angle θb of the sloped surface 223 was set to 70°.

In example 3 of the present invention shown in FIG. 4(*c*), the outer diameter ϕ3 of the distal end portion 222*a* of the passage guide part 222 was set to 0.1 mm and the inclination angle θb of the sloped surface 223 was set to 70°.

In comparative example 1 shown in FIG. 5(*a*), the passage guide part 222 was not formed and the lead wire having the diameter of ϕ0.8 mm was directly used. Therefore, an end diameter of the lead wire was ϕ0.8 mm and the inclination angle θb was 0°.

In comparative example 2 shown in FIG. 5(*b*), the outer diameter ϕ3 of the distal end portion 222*a* of the passage guide part 222 was set to 0.6 mm and the inclination angle θb of the sloped surface 223 was set to 60°.

In comparative example 3 shown in FIG. 5(*c*), the outer diameter ϕ3 of the distal end portion 222*a* of the passage guide part 222 was set to 0.2 mm and the inclination angle θb of the sloped surface 223 was set to 15°.

In comparative example 4 shown in FIG. 5(*d*), the outer diameter ϕ3 of the distal end portion 222*a* of the passage guide part 222 was set to 0.6 mm and the inclination angle θb of the sloped surface 223 was set to 60°.

In comparative example 5 shown in FIG. 5(*e*), the outer diameter ϕ3 of the distal end portion 222*a* of the passage guide part 222 was set to 0.6 mm and the inclination angle θb of the sloped surface 223 was set to 70°.

On the other hand, on the rubber seal 4 side, as explained above, the hole diameter ϕ2 of the lead wire passage hole 52 is 0.5 mm. Besides, the hole diameter ϕ4 of the round bar mating hole 51 is 1.9 mm, axial direction thickness T1 of the lead wire passage hole 52 is 0.5 mm, height T2 of the guide surface 53 viewed from the inner edge of the lead wire passage hole 52 is 0.4 mm, and a radial direction distance dl of the guide surface 53 is 0.7 mm.

Note that the rubber seal 4 is preferably a rubber material having Shore hardness equal to or higher than 80 that cause less scratches. In this example, a rubber material having Shore hardness of 84 was used as the rubber seal 4.

Figure 6:
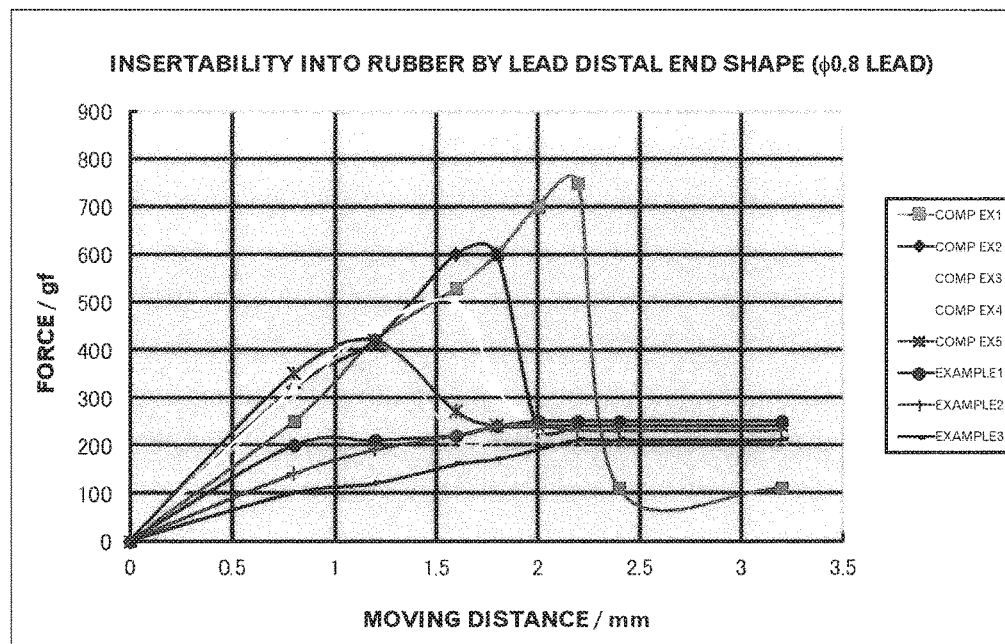
FIG. 6 is a graph of examples 1 to 3 of the present invention and comparative examples 1 to 5 showing pressure applied to a capacitor element when the lead terminal is inserted.

In Table 1, pressure (gf) of the caulking portion 21*c* of the lead terminal 2 measured by a push-pull gauge in examples 1 to 3 of the present invention and comparative examples 1 to 5 is shown. In FIG. 6, a graph by measurement data of the pressure is shown. Note that a distance in Table 1 and the graph is set to 0 mm in a place immediately before the outside lead wire 22 collides with the lead wire passage hole 52.

TABLE 1

| Moving distance (mm) | Force (gf/push-pull gauge data) | | | | | | | |
|---|---|---|---|---|---|---|---|---|
| | Comparative example 1 | Comparative example 2 | Comparative example 3 | Comparative example 4 | Comparative example 5 | Example 1 | Example 2 | Example 3 |
| 0 | 0 | 0 | 0 | 0 | 0 | 0 | 0 | 0 |
| 0.8 | 250 | 320 | 320 | 300 | 350 | 200 | 140 | 100 |
| 1.2 | 420 | 420 | 450 | 420 | 420 | 210 | 190 | 120 |
| 1.6 | 530 | 600 | 500 | 210 | 270 | 220 | 220 | 160 |
| 1.8 | 600 | 600 | 320 | 210 | 240 | 240 | 240 | 170 |
| 2.0 | 700 | 240 | 240 | 210 | 240 | 250 | 240 | 190 |
| 2.2 | 750 | 240 | 240 | 210 | 240 | 250 | 240 | 210 |
| 2.4 | 110 | 240 | 240 | 210 | 240 | 250 | 240 | 210 |
| 3.2 | 110 | 240 | 240 | 210 | 240 | 250 | 240 | 210 |

As it is seen from Table 1 and the graph, the peak pressure is 750 (gf) in comparative example 1, the peak pressure is 600 (gf) in comparative example 2, the peak pressure is 500 (gf) in comparative example 3, and the peak pressure is 420 (gf) in comparative example 4 and comparative example 5. The pressure is likely to deteriorate the characteristics of the capacitor element 1 when the lead wire is inserted through.

On the other hand, in examples 1 to 3 of the present invention, a peak of the pressure is hardly observed when the lead wire is inserted through. In examples 1 and 2 of the present invention, the pressure transitions at about 220 to 250 (gf). In examples 3 of the present invention, the pressure transitions at about 120 to 210 (gf).

Therefore, according to the present invention, it is possible to insert the lead terminal 2 through the terminal passage hole 5 of the rubber seal 4 without applying such an excessively large load as to deteriorate characteristics to the capacitor element 1 and while keeping a state in which the lead terminal 2 can be surely shut off from the outside air. Note that, in the case of example 3 of the present invention, it is likely that a product main body is hurt by a sharp-pointed shape of the distal end. Therefore, examples 1 and 2 of the present invention are considered to be most preferable.

Incidentally, as shown in FIG. 1, when an inclination angle of the welded section 23 with respect to the imaginary plane X-X is represented as θc, the inclination angle θc of the welded section 23 is generally about 60 to 70°, although depending on the outer diameter φ5 of the round bar section 21b and the outer diameter φ1 of the outside lead wire 22.

Note that the actual surface of the welded section 23 includes fine unevenness. The inclination angle θc is an angle of a line connecting a lower end 23a and an upper end 23b of the welded section 23 (the lower end edge of the round bar section 21b) with respect to the imaginary plane X-X.

On the other hand, when the inclination angle θa of the guide surface 53 is set to, for example, 30° as in the example explained above, as shown in FIG. 7, after the lead wire is inserted through, a gap G is formed between the guide surface 53 and the welded section 23. Therefore, a problem explained below occurs.

As explained with reference to FIG. 3, the lead terminal 2 is inserted through the terminal passage hole 5 of the rubber seal 4 in a state in which the lead terminal 2 is attached to the capacitor element 1. Since the electrolyzed liquid is impregnated in the capacitor element 1, a part of the electrolyzed liquid collects in the gap G. Then, the electrolyzed liquid sometimes gradually leaks from a space between the outside lead wire 22 and the lead wire passage hole 52.

This problem is solved by setting the inclination angel θa of the guide surface 53 close to the inclination angle θc of the welded section 23 to narrow the gap G. In that case, the following points need to be taken into account.

Figure 7:
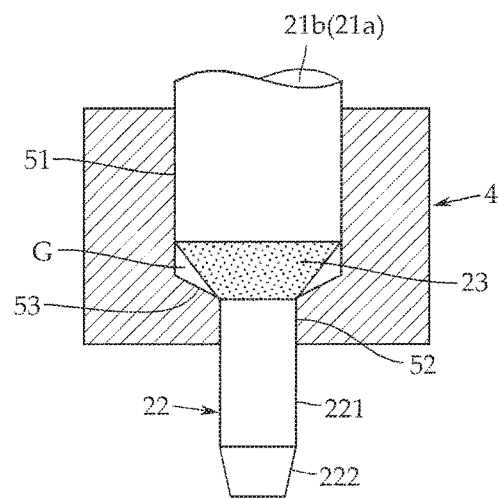
FIG. 7 is a sectional view showing a state in which the outside lead wire of the lead terminal is inserted through the terminal passage hole of the rubber seal.
Figure 8:
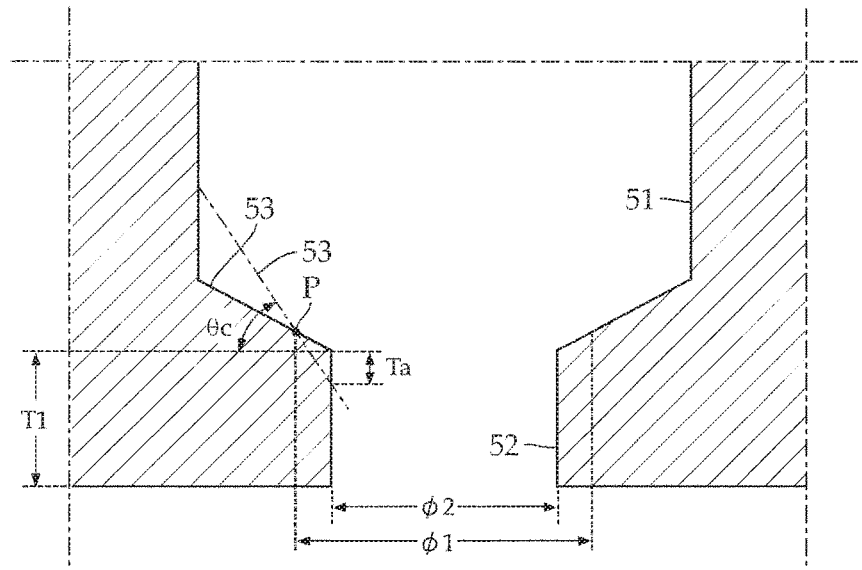
FIG. 8 is a sectional view of a terminal passage hole for explaining points to note in setting a guide surface of the terminal passage hole close to an inclination angle of a welded section.

Referring to FIG. 8, when the outside lead wire 22 is inserted through the lead wire passage hole 52 as shown in FIG. 7, the lower end 23a of the welded section 23 collides with an intersection P of the guide surface 53 and the outer diameter surface of the outside lead wire 22. Therefore, as indicated by an alternate long and two short dashes line, it is conceivable to form the guide surface 53 as an inclined surface having the inclination angle θc passing the intersection P.

However, if the guide surface 53 is formed as the inclined surface, the axial direction thickness T1 of the lead wire passage hole 52 is shaved by Ta and reduced. Therefore, this is not preferable in hermetically sealing the outside lead wire 22 and reliability is spoiled.

Figure 9:
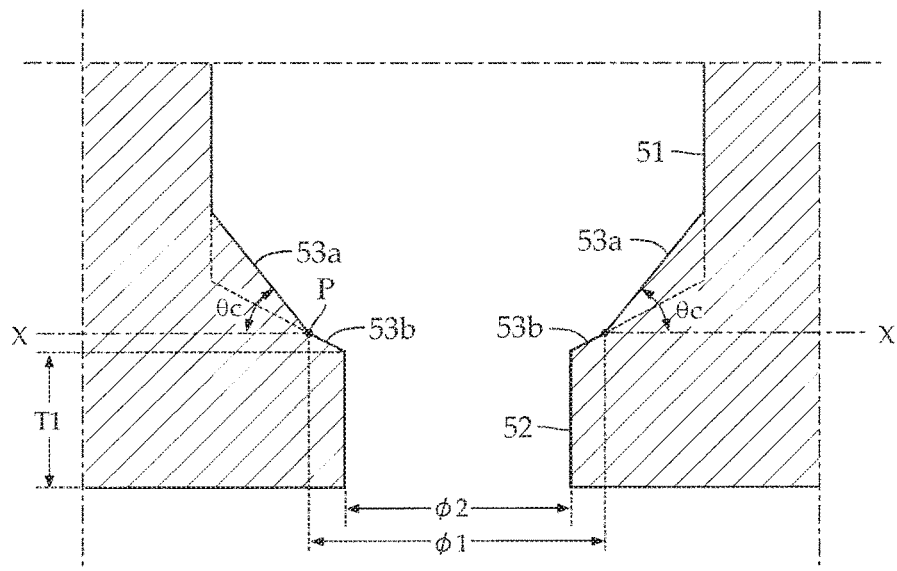
FIG. 9 is a sectional view of the terminal passage hole showing a preferred embodiment for setting the guide surface of the terminal passage hole close to the inclination angle of the welded section.

Therefore, in the present invention, as shown in FIG. 9, with the intersection P set as a boundary, the guide surface 53 is divided into first and second two broken line-like inclined surfaces 53a and 53b having different inclination angles.

That is, the first inclined surface 53a is formed as an inclined surface inclined at an angle (e.g., about 60 to 70°) substantially the same as the inclination angle θc of the welded section 23 from the intersection P to the inner surface of the round bar mating hole 51. On the other hand, the second inclined surface 53b is formed as an inclined surface inclined at an angle (e.g., about 30°) smaller than the inclination angle θc from the intersection P to the inner peripheral edge of the terminal passage hole 52.

Consequently, it is possible to set the inclination angle of the guide surface 53 close to the inclination angle θc of the welded section 23 and narrow the gap G without reducing the axial direction thickness T1 of the lead wire passage hole 52, without hardly shifting an attachment height position of the tab terminal 21 to the rubber seal 4 upward in FIG. 7, and without spoiling a guidance effect of the passage guide part 222 of the outside lead wire 22 with respect to the lead wire passage hole 52.

Figure 10A:
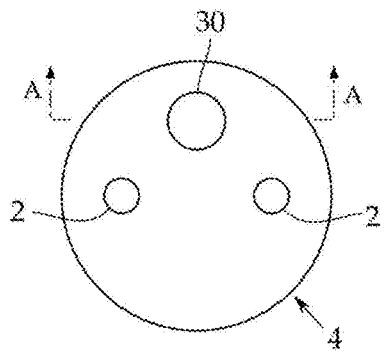
FIG. 10(a) is a plan view showing a rubber seal having three terminals including a dummy terminal and FIG. 10(b) is an A-A line enlarged sectional view of the rubber seal.
Figure 11:
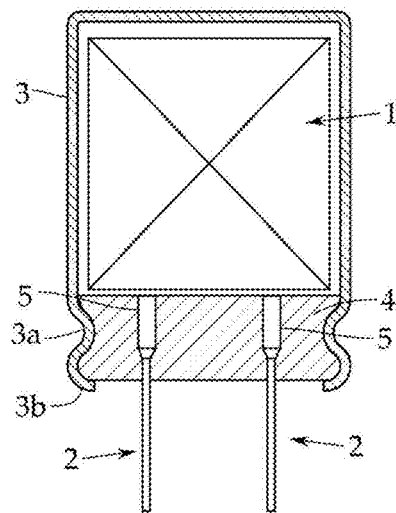
FIG. 11 is a schematic sectional view showing a basic configuration of the aluminum electrolytic capacitor.

The present invention also includes a three-terminal type aluminum electrolytic capacitor including, as shown in FIG. 10(a), besides the lead terminals 2,2 (see FIGS. 11 and 12) respectively attached to the anode foil 1a and the cathode foil 1b, an electrically neutral dummy terminal 30 not connected to the capacitor element 1 is inserted through the rubber seal 4.

The dummy terminal 30 is a terminal soldered to a not-shown circuit board together with the lead terminals 2, 2 solely to improve mounting stability. The dummy terminal 30 is different from the lead terminal 2 in that the dummy terminal 30 is larger in diameter than the lead terminal 2 and, as shown in FIG. 10(b), the tab terminal 21 does not include the flat section 21a and includes only the round bar section 21b.

Figure 10B:
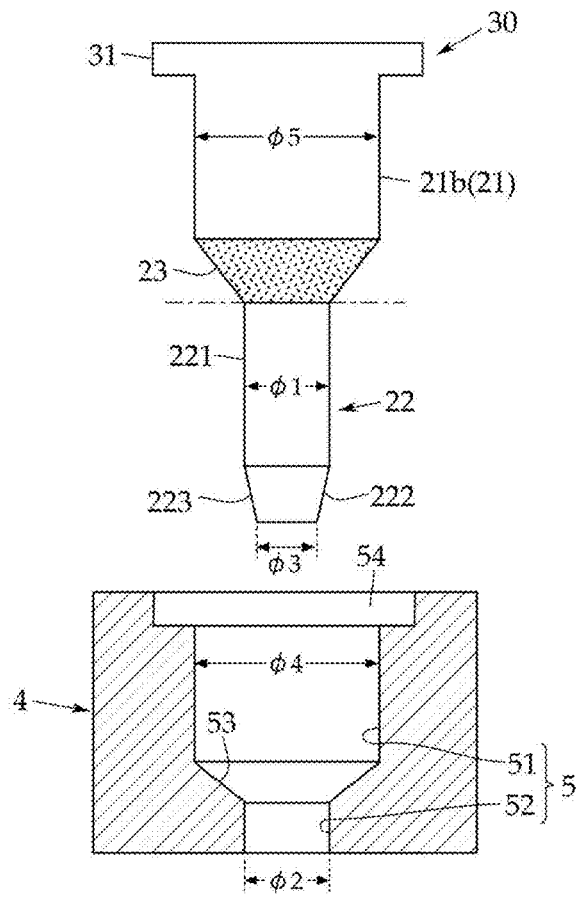

That is, on one end side (in FIG. 10(b), the lower end side) of the round bar section 21b, the outside lead wire 22 is integrally attached via the welded section 23. In this embodiment, on the other end side (in FIG. 10(b), the upper end side) of the round bar section 21b, a flange section 31 expanded in diameter is formed.

On the rubber seal 4 side, the terminal passage hole 5 formed by coaxially connecting the large-diameter round bar mating hole 51, in which the round bar section 21b of the dummy terminal 30 is fit, and the small-diameter lead wire passage hole 52, through which the outside lead wire 22 is inserted, is drilled. However, in this embodiment, a recess 54, in which the flange section 31 is closely fit, is formed at the upper edge of the round bar mating hole 51.

In the three-terminal type aluminum electrolytic capacitor, the hole diameter φ2 of the lead wire passage hole 52 of the dummy terminal 30 is smaller than the outer diameter φ1 of the outside lead wire 22 (φ2<φ1) to shut off the welded section 23 from the outside air. However, to make it possible to insert the outside lead wire 22 through the lead wire passage hole 52 of the rubber seal 4 without applying such an excessively large load as to deteriorate characteristics to the capacitor element 1 and while keeping a state in which the outside lead wire 22 can be surely shut off from the outside air, as in the lead terminal 2, the passage guide part 222 having the sloped surface 223 is integrally formed at the distal end of the outside lead wire 22. In the terminal passage hole 5, the guide surface 53 for guiding the distal end of the outside lead wire 22 to the lead wire passage hole 52 is formed.

In order to further narrow the gap G (see FIG. 7) between the welded section 23 in the dummy terminal 30 and the guide surface 53, as explained with reference to FIG. 9 above, the guide surface 53 may include the first inclined surface 53a inclined at an angle substantially the same as the inclination angle θc of the welded section 23 from the intersection P to the inner surface of the round bar mating hole 51 and the second inclined surface 53b inclined at an angle smaller than the inclination angle θc from the intersection P to the inner peripheral edge of the terminal passage hole 52.

In this way, according to the present invention, in the three-terminal type aluminum electrolytic capacitor including the dummy terminal 30, too, it is possible to insert the outside lead wire 22 through the lead wire passage hole 52 of the rubber seal 4 without applying such an excessively large load as to deteriorate characteristics to the capacitor element 1 and while keeping a state in which the outside lead wire 22 can be surely shut off from the outside air and it is possible to form the gap G between the welded section 23 and the guide surface 53 as narrow as possible.

DESCRIPTION OF SYMBOLS

1 Capacitor element
2 Lead terminal
3 Armor case
4 Rubber seal
5 Terminal passage hole
21 Tab terminal
21a Flat section
21b Round bar section
22 Outside lead wire
221 Lead wire body
222 Passage guide part
222a Distal end portion of the passage guide part
223 Sloped surface
23 Welded section
30 Dummy terminal
51 Round bar mating hole
52 Lead wire passage hole
53 Guide surface
53a First inclined surface
53b Second inclined surface
P Intersection

What is claimed is:

1. An aluminum electrolytic capacitor comprising:
a capacitor element formed by winding, via a separator, an anode foil and a cathode foil both having lead terminals attached thereto;
an armor case having a bottomed cylindrical shape in which the capacitor element is housed together with a predetermined electrolytic substance; and
a rubber seal having a terminal passage hole for the lead terminals drilled therein and mounted on an opening section of the armor case,
the lead terminal including a tab terminal having a flat section and a round bar section and an outside lead wire having a lead-free tin plated layer on a surface and welded to an end of the round bar section,
the terminal passage hole of the rubber seal including a round bar mating hole, in which the round bar section of the tab terminal is fit, and a lead wire passage hole coaxial with the round bar mating hole and smaller in diameter than the round bar mating hole, the outside lead wire being inserted through the lead wire passage hole, and
a hole diameter of the lead wire passage hole being smaller than an outer diameter of the outside lead wire, the outside lead wire being forcibly inserted through the lead wire passage hole to be drawn out to the outside of the armor case, and a welded section of the round bar section and the outside lead wire being shut off from an outside air, wherein a conical guide surface gradually reduced in diameter is formed between the round bar mating hole and the lead wire passage hole in the terminal passage hole,
the outside lead wire includes a lead wire body larger in diameter than the hole diameter of the lead wire passage hole and a passage guide part integrally connected to a distal end portion of the lead wire body,
the passage guide part is formed to be gradually reduced in diameter from the lead wire body to be smaller in diameter than the hole diameter of the lead wire passage hole,
in the passage guide part, a substantially conical sloped surface having a predetermined inclination angle is formed, and
when an inclination angle of the guide surface with respect to an imaginary plane X orthogonal to an axis Y passing the terminal passage hole is represented as θa and the inclination angle of the sloped surface is represented as θb, θa<θb.

2. The aluminum electrolytic capacitor according to claim 1, wherein an inclination angle of the welded section with respect to the imaginary plane X orthogonal to the axis Y passing the terminal passage hole is represented as θc, and with a boundary set in an intersection portion of an extended line of an outer diameter surface of the lead wire body and the guide surface in a state in which the lead wire body and the lead wire passage hole are set to be coaxial, the guide surface includes a first inclined surface inclined at an angle substantially the same as the inclination angle θc from the intersection portion to an inner surface of the round bar mating hole and a second inclined surface inclined at an angle smaller than the inclination angle θc from the intersection portion to an inner peripheral edge of the lead wire passage hole.

3. The aluminum electrolytic capacitor according to claim 2, wherein the lead terminals are fit in the terminal passage hole until a lower end of the welded section comes into contact with the intersection portion so that the first inclined surface substantially adheres to the welded section.

4. A rubber seal for an aluminum electrolytic capacitor comprising a terminal passage hole through which a lead terminal formed by welding an outside lead wire to an end of a round bar section included in a tab terminal, the terminal passage hole including a round bar mating hole in which the round bar section is fit and a lead wire passage hole coaxial with the round bar mating hole and smaller in diameter than the round bar mating hole, the outside lead wire being inserted through the lead wire passage hole, and
a hole diameter of the lead wire passage hole being smaller than an outer diameter of the outside lead wire, and the outside lead wire being forcibly inserted through the lead wire passage hole such that a welded section of the round bar section and the outside lead wire is shut off from the outside air, wherein
a conical guide surface gradually reduced in diameter is formed between the round bar mating hole and the lead wire passage hole in the terminal passage hole,
an inclination angle of the welded section with respect to an imaginary plane X orthogonal to an axis Y passing the terminal passage hole is represented as θc, and
with a boundary set in an intersection portion of an extended line of an outer diameter surface of the outside lead wire and the guide surface in a state in which the outside lead wire and the lead wire passage hole are set to be coaxial, the guide surface includes a first inclined surface inclined at an angle substantially the same as the inclination angle θc from the intersection portion to an inner surface of the round bar mating hole and a second inclined surface inclined at an angle smaller than the inclination angle θc from the intersection portion to an inner peripheral edge of the lead wire passage hole.

* * * * *